United States Patent [19]

Ritchie

[11] Patent Number: 5,417,022

[45] Date of Patent: May 23, 1995

[54] HYBRID FRAME RAIL

[75] Inventor: Jack J. Ritchie, Washington, Mich.

[73] Assignee: The Budd Company, Troy, Mich.

[21] Appl. No.: 205,836

[22] Filed: Mar. 3, 1994

[51] Int. Cl.⁶ .......................... E04C 1/42; E04C 2/26; E04C 2/38

[52] U.S. Cl. .................. 52/309.13; 52/729; 428/120

[58] Field of Search .............. 52/309.13, 727, 729, 52/730.1, 309.14

[56] References Cited

U.S. PATENT DOCUMENTS

| | | | |
|---|---|---|---|
| 1,658,831 | 2/1928 | Blakeley | 52/729 |
| 1,818,121 | 8/1931 | Edwards et al. | 52/729 |
| 3,300,839 | 1/1967 | Lichti | 52/729 |
| 3,570,208 | 3/1971 | Nikai et al. | 52/727 X |
| 4,070,845 | 1/1978 | Cody | 52/729 X |
| 4,129,974 | 12/1978 | Ojalvo . | |
| 4,129,974 | 12/1978 | Ojalvo | 52/729 |
| 4,251,973 | 2/1981 | Paik . | |
| 4,576,849 | 3/1986 | Gardiner . | |
| 4,630,419 | 12/1986 | Pilgrim | 52/309.13 |
| 4,734,146 | 3/1988 | Halcomb et al. . | |
| 4,937,998 | 7/1990 | Goldberg | 52/729 |
| 5,042,395 | 8/1991 | Wackerle et al. . | |
| 5,112,422 | 5/1992 | Takahashi . | |
| 5,152,112 | 10/1992 | Eustace . | |
| 5,325,647 | 7/1994 | Forry | 52/729 X |

FOREIGN PATENT DOCUMENTS 4269249 9/1992 Japan .
8704207 12/1986 WIPO .

*Primary Examiner*—Carl D. Friedman
*Assistant Examiner*—Yvonne Horton-Richardson
*Attorney, Agent, or Firm*—Harness, Dickey & Pierce

[57] ABSTRACT

The present invention relates to a hybrid frame rail including a pair of metallic flanges separated by a convoluted web including a plurality of alternately opposing recesses extending transversely to the flanges. In manufacture, the convoluted web is generally adhesively bonded to the flanges to form the hybrid frame rail.

17 Claims, 2 Drawing Sheets

U.S. Patent May 23, 1995 Sheet 1 of 2 5,417,022
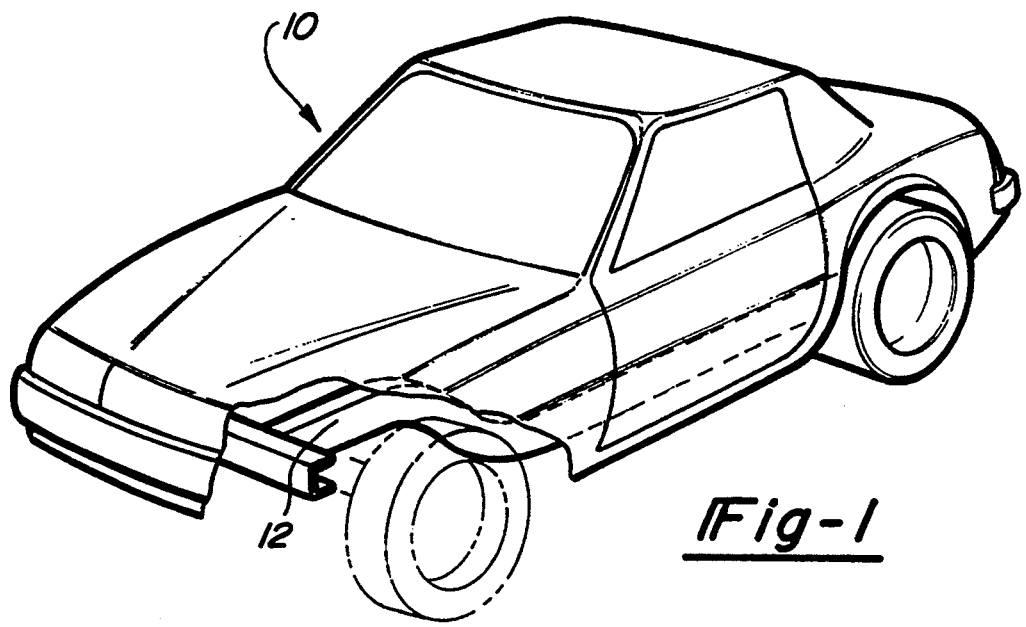
Fig-1
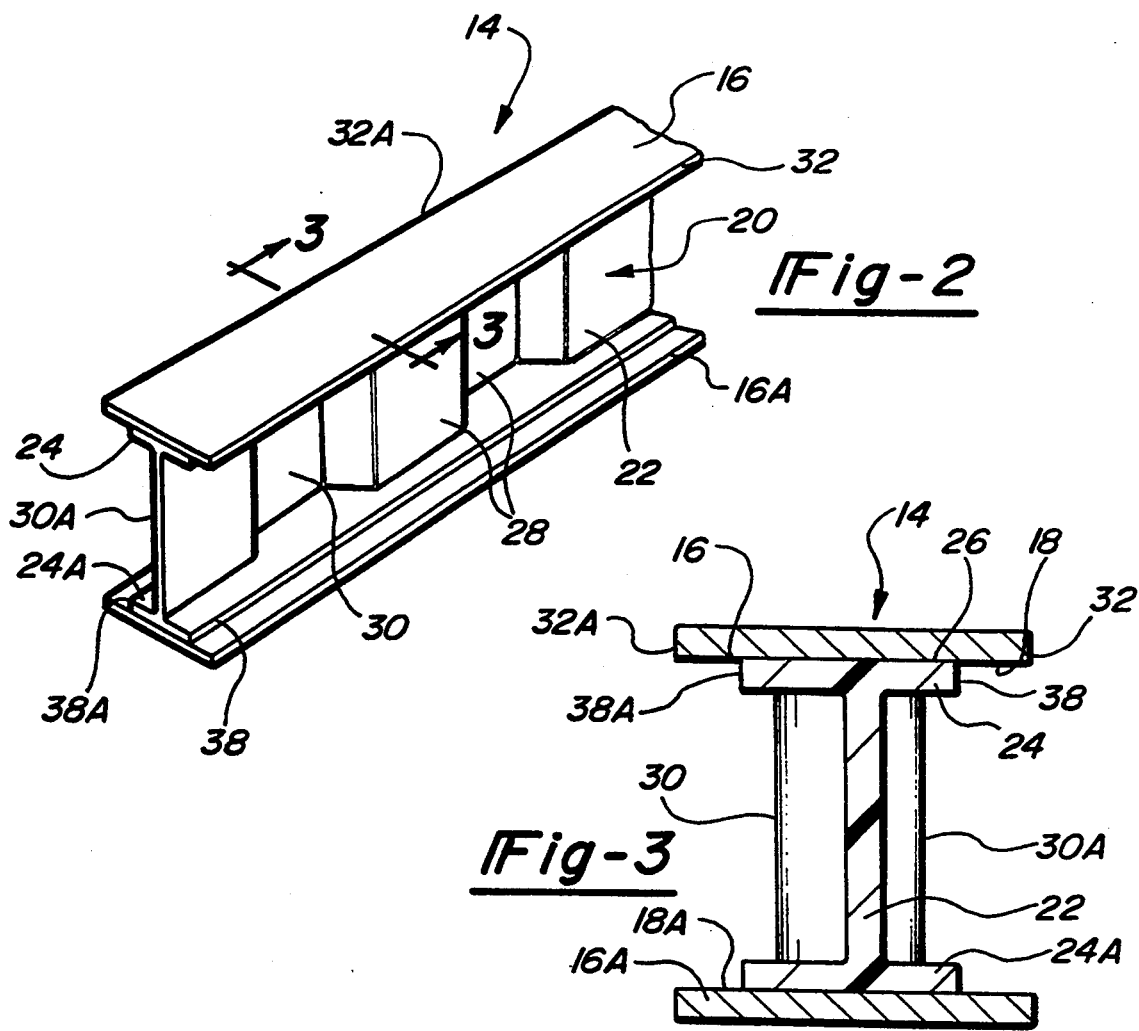
Fig-2
Fig-3

HYBRID FRAME RAIL

BACKGROUND OF THE INVENTION

I. Technical Field

The present invention relates to a hybrid frame rail and, more particularly, to a hybrid frame rail including a pair of metallic flanges separated by a convoluted glass reinforced composite web generally extending the length of the frame rail.

II. Discussion

In the automobile industry, there has been a relatively recent trend toward limiting the overall weight of automotive vehicles. Automobiles which are lighter in weight tend to offer better fuel efficiency and often are less expensive to produce and manufacture. As a result of this trend, much attention has been given to reducing the weight of various components, such as body panels, including but not limited to, door panels, deck lids, body side panels, hoods, truck lids and headliners, among others. Materials such as lightweight aluminum alloys, ceramics, high durable plastics and foams are often used to form such lightweight body panels.

Likewise, much attention has also been given to reducing the weight of vehicle engines, since engines account for a significant portion of the vehicles overall weight. For example, ceramic materials are now commonly used in the production of engine components including the engine block itself. Ceramic materials tend to have a strength comparable to metals and offer good heat resistance characteristics.

With the advent of lighter weight body panels and vehicle engines the need for excessively heavy vehicle frames and chassis have been greatly reduced. Thus, the present invention is directed to providing a lightweight vehicle frame rail which is relatively inexpensive to produce and manufacture and which has enhanced load handling capabilities.

SUMMARY OF THE INVENTION

The present invention is primarily concerned with providing a hybrid frame rail which is relatively lightweight and structurally enhanced. In accordance with the teachings of the present invention, a hybrid frame rail is provided which includes a pair of spaced apart flanges and a convoluted web which extends therebetween. Preferably the flanges are made from a metallic material such as high tensile corrosion resistant steel or an aluminum alloy and the convoluted web is made from glass reinforced molding compounds.

The primary advantage of the present invention is a reduction in the overall weight of the automotive vehicle. By reducing the overall weight of the vehicle, a more fuel efficient vehicle can be produced.

Another object of the present invention is to provide a hybrid frame rail which resists deformation under heavy loads.

Yet another object of the present invention is to provide a hybrid frame rail which is relatively inexpensive and easy to manufacture.

Still another object of the present invention is a design which supplies the greatest design flexibility with the minimum investment cost.

BRIEF DESCRIPTION OF THE DRAWINGS

The various advantages of the present invention will become apparent to those skilled in the art after having the benefit of reading the following specification and by reference to the drawings in which:

FIG. 1 is a perspective view of an automotive vehicle, partially broken away, to show a conventional vehicle frame rail;

FIG. 2 is a perspective view of a hybrid frame rail in accordance with the teachings of the present invention;

FIG. 3 is a cross-sectional view taken along lines 3—3 of FIG. 2 which illustrates the assembly of the hybrid frame rail;

DETAILED DESCRIPTION OF THE PREFERRED EMBODIMENT

Figure 4:
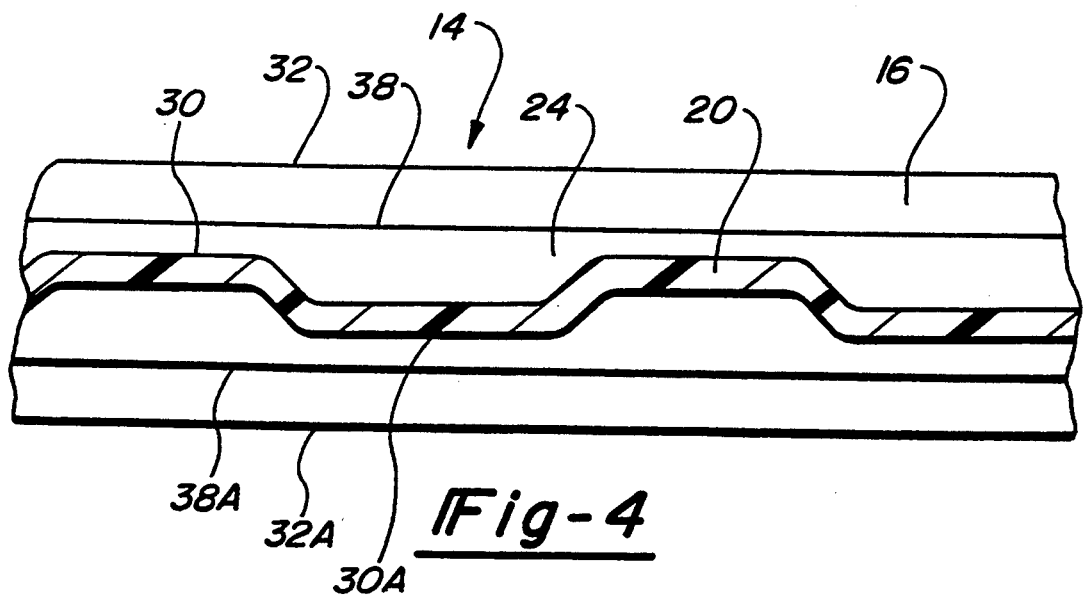
FIG. 4 is a top view illustrating the hybrid frame rail embodiment of FIGS. 1, 2 and 3 according to the teachings of the present invention.

As alluded to earlier, the methods and various embodiments of the present invention are directed to a hybrid frame rail having a pair of flanges and a convoluted web extending therebetween. From the outset, it should be understood that while the present invention will hereinafter be described with reference to a hybrid frame rail for use in association with automotive vehicles other applications such as construction support members and the like are considered to be alternative uses within the scope of the present invention.

Referring to FIG. 1 a perspective view of an automotive vehicle 10 including a conventional vehicle frame rail 12 is provided. As can be seen, conventional vehicle frame rails 12 are typically one piece metallic structures having an overall C-shape in cross-section. While conventional vehicle frame rails offer good structural characteristics they are considered to be unnecessarily heavy and contribute to unacceptable low fuel efficiency.

Under the present invention, as illustrated with reference to FIGS. 2 through 5 a hybrid frame rail 14 is provided as having an overall H or I shape in cross-section. The hybrid frame rail 14 includes a pair of flanges 16 and 16a separated by a convoluted web 20. Preferably the flanges 16 and 16a, respectively, are elongated metallic strips made from a high tensile strength corrosion resistant steel. For automotive vehicle applications, typically each flange will have a thickness in the range of between about 0.10 inches up to about 0.20 inches depending upon the manufactures specifications. The length of each flange is generally dependent upon the automotive vehicles length and width.

Extending between the first and second flanges 16 and 16a, respectively, is the web 20. The web 20 is preformed to include a convoluted center bar 22 and a pair of perpendicularly disposed elongated bands 24 and 24a extending integrally along each end of the center bar 22. The elongated bands 24 and 24a are also in the form of relatively thin strips which are intended to have a contour which corresponds to the contour of the flanges 16 and 16a. Generally, both the flanges 16 and 16a and the elongated bands 24 and 24a are linear and relatively flat. However, it is contemplated that under an alternative embodiment wherein the flanges 16 and 16a are arcuate (not shown) bands 24 and 24a would also be complimentarily arcuate.

For automotive applications the center bar 22 and elongated bands 24 and 24a preferably have a thickness of between about 0.10 and 0.20 inches. The elongated bands 24 and 24a also have an average width of between about 0.085 and 1.25 inches.

The center bar 22 of the web 20 is provided with convolutions 28 extending transversely to the elongated bands 24 and 24a. While the convolutions 28 extend from the first elongated band 24 to the second elongated band 24a it should be noted by those skilled in the art that the convolutions need not extend the entire length of the web. The convolutions 28 are preferably in the form of alternately opposing recesses 30 and 30a facing either side of the web 20. Typically, the total width between one recess 30 and an adjacent alternative recess 30a is between about 0.40 and 0.60 inches.

In contrast to the metallic flanges 16 and 16a, the convoluted web 20 is generally made from a glass reinforced compound. Preferably, the convoluted web has a tensile strength of at least 70 MPa or 10,150 PSI.

According to the teachings of the present invention, alternative embodiments employing a pair of spaced apart flanges 16 and 16a joined by a convoluted web 20 are provided. As illustrated, with reference to FIGS. 2 and 3, according to the first hybrid frame rail embodiment the flanges 16 and 16a are substantially rectangular in shape having long laterally extending edges 32 and 32a. Similarly, the two elongated bands 24 and 24a of the convoluted web also have long laterally extending edges 38 and 38a.

Figure 5:
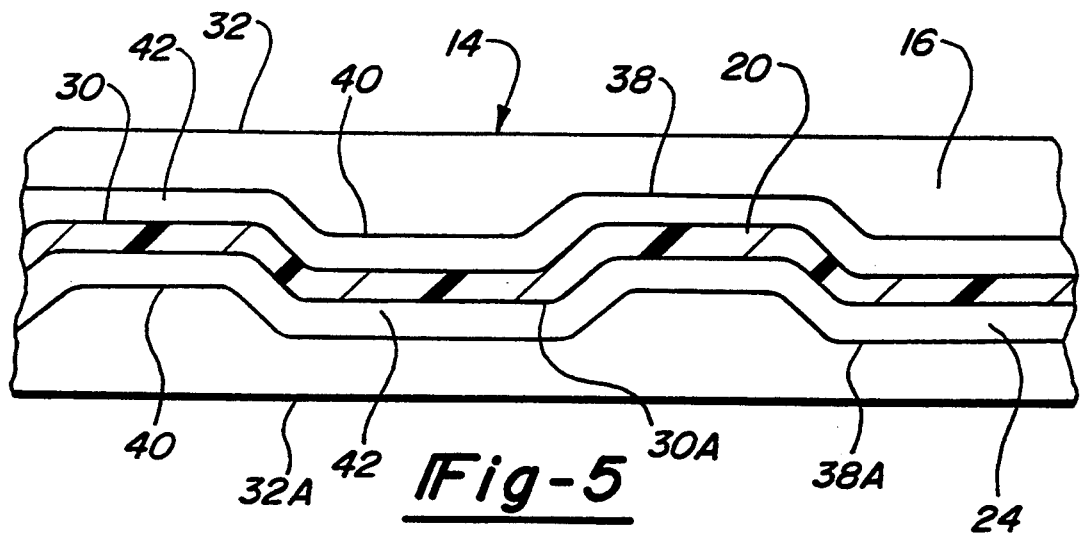
FIG. 5 is a top view illustrating an alternative preferred hybrid frame rail embodiment according to the teachings of the present invention.

Referring to FIG. 5, a top view illustrating an alternative preferred hybrid frame rail embodiment is provided. While only a top view is provided it should be clear to those skilled in the art that there are complimentary and identical pairs of flanges and elongated bands as in the embodiment presented with reference to FIGS. 1 through 4. According to the embodiment of FIG. 5 the flanges are substantially rectangular while the elongated bands of the web are substantially serpentine. The substantially serpentine elongated bands have alternating detent and protruding portions 34 and 36, respectively, disposed along the laterally extending edges 40 and 40a which correspond substantially in length to each alternating recess of the convoluted web 20. For example, if the recessed portions have a length of 2.0 inches then ideally each of the detent and protruding portions 34 and 36 would also have a length of approximately 2.0 inches. Again, while only a single flange and elongated band are shown in FIG. 4 it should be understood that both flanges 16 and 16a and both elongated bands 24 and 24a as shown in FIGS. 2 and 3 are intended to be modified in the above described manner under this embodiment.

With regard to the manufacture of each of aforementioned embodiments, generally an adhesive material is applied to the inner surfaces 18 and 18a of each flange or the outer surfaces 26 and 26a of each elongated band, or both, as best illustrated with reference to FIGS. 2 and 3 and the flanges are brought into contact with the elongated bands, with the flanges preferably being disposed contiguously along the length of the elongated bands. Upon combining the web and flanges, preferably the elongated bands are located along the central axis of the flanges. This arrangement is believed to contribute to the structural integrity of the hybrid frame rail. It should be understood that while adhesively bonding the flanges 16 and 16a to the convoluted web 20 with a commercially available adhesive such as epoxy or urethane-based products is preferred, other means of attaching the convoluted web and flanges are possible. For example, mechanical fasteners such as nut and bolt assemblies, studs and rivets (not shown) can be utilized.

Additionally, it should be pointed out that the metallic upper and lower flanges 16 and 16a allow for attachment to other frame components such as cross members, engine mounts or spring hangers by welding, riveting or bolting.

In view of the foregoing, it can now be appreciated that the hybrid frame rail assembly offers significant advantages over other conventional frame rails. Among these advantages are a significant reduction in weight and greater design flexibility for improving structural capabilities in selected areas without penalizing the structure with unnecessary weight. In addition, this design is more flexible in its geometric shape for packaging around vehicle components as opposed to current stamped steel rails. Still other advantages will become apparent to those skilled in the art after having the benefit of a study of the specification, drawings and the following claims.

What is claimed is:

1. A hybrid frame rail, comprising
a glass reinforced compound web including an elongated center bar and a pair of elongated bands with laterally extending edges, said pair of elongated bands being spaced apart along each end of the center bar and disposed transversely thereto; and
a pair of metallic flanges wherein said metallic flanges are attached substantially contiguously over the elongated bands.

2. The hybrid frame rail of claim 1, wherein said center bar is convoluted to include a plurality of alternately opposing recesses extending transversely to said elongated bands.

3. The hybrid frame rail of claim 2, wherein said alternately opposing recesses extend the entire height of the center bar from one elongated band to the other elongated band.

4. The hybrid frame rail of claim 1, wherein the height of the elongated center bar is at least triple the width of the elongated bands.

5. The hybrid frame rail of claim 1, wherein the height of the elongated center bar is at least double the width of the flanges.

6. The hybrid frame rail of claim 1, wherein the width of the flanges is approximately twice the width of the elongated bands.

7. The hybrid frame rail of claim 2, wherein the laterally extending edges of the elongated bands are provided with a plurality of alternating detent and protruding portions which correspond to the alternating opposing recesses of the center bar.

8. The hybrid frame rail of claim 1, wherein said web has a tensile strength of at least 70 MPa.

9. The hybrid frame rail of claim 1, wherein said flanges are made from a metal or metal alloy selected from the group consisting of high tensile strength corrosion resistant steels or high strength aluminum.

10. A hybrid frame rail, comprising:
a glass reinforced compound web including first and second elongated bands with laterally extending edges separated by an integral transversely extending center bar, said center bar including a plurality of alternately opposing recesses extending transversely to the elongated bands; and
a pair of metallic flanges which are attached to said web such that a first flange is disposed contiguously over the first elongated band and the second flange is disposed contiguously over the second elongated band thus sandwiching the glass reinforced compound web between the metallic flanges.

11. The hybrid frame rail of claim 10, wherein said alternately opposing recesses extend the entire height of the center bar from the first elongated band to the second elongated band.

12. The hybrid frame rail of claim 10, wherein the height of the elongated center bar is at least triple the width of the elongated bands.

13. The hybrid frame rail of claim 10, wherein the height of the elongated center bar is at least double the width of the flanges.

14. The hybrid frame rail of claim 10, wherein the width of the flanges is approximately twice the width of the elongated bands.

15. The hybrid frame rail of claim 10, wherein the laterally extending edges of the elongated bands are provided with a plurality of alternating and protruding portions which correspond to the alternating opposing recesses of the center bar.

16. The hybrid frame rail of claim 10, wherein said web has a tensile strength of at least 70 MPa.

17. The hybrid frame rail of claim 10, wherein said flanges are made from a metal or metal alloy selected from the group consisting of high tensile strength corrosion resistant steels or high strength aluminum.

* * * * *